United States Patent
Krishnaswamy et al.

(10) Patent No.: US 9,672,821 B2
(45) Date of Patent: Jun. 6, 2017

(54) ROBUST SPEECH RECOGNITION IN THE PRESENCE OF ECHO AND NOISE USING MULTIPLE SIGNALS FOR DISCRIMINATION

(71) Applicant: APPLE INC., Cupertino, CA (US)

(72) Inventors: Arvindh Krishnaswamy, San Jose, CA (US); Charles P. Clark, Mountain View, CA (US); Sarmad Malik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 14/835,588

(22) Filed: Aug. 25, 2015

(65) Prior Publication Data
US 2016/0358602 A1   Dec. 8, 2016

Related U.S. Application Data

(60) Provisional application No. 62/171,965, filed on Jun. 5, 2015.

(51) Int. Cl.
| | |
|---|---|
| G10L 15/00 | (2013.01) |
| G10L 15/20 | (2006.01) |
| G10L 15/16 | (2006.01) |
| G10L 21/0208 | (2013.01) |

(52) U.S. Cl.
CPC .............. *G10L 15/20* (2013.01); *G10L 15/16* (2013.01); *G10L 2021/02082* (2013.01)

(58) Field of Classification Search
CPC ... H04M 9/082; H04M 3/002; G10L 21/0208; G10L 15/02; G10L 19/012; G10L 2021/02082
USPC ........... 379/406.01, 406.05, 406.13, 406.14; 381/61, 71.11; 600/446; 704/200, 202, 704/226, 233
See application file for complete search history.

(56) References Cited

U.S. PATENT DOCUMENTS

| | | | | |
|---|---|---|---|---|
| 5,970,446 | A * | 10/1999 | Goldberg ................ | G10L 15/20 704/233 |
| 6,160,886 | A * | 12/2000 | Romesburg ........... | H04M 9/082 379/406.05 |
| 6,167,133 | A * | 12/2000 | Caceres .................... | H04B 3/23 370/289 |
| 6,415,253 | B1 * | 7/2002 | Johnson .............. | G10L 21/0208 381/94.2 |

(Continued)

*Primary Examiner* — Michael Colucci
(74) *Attorney, Agent, or Firm* — Blakely, Sokoloff, Taylor & Zafman LLP

(57) ABSTRACT

Systems and methods for speech recognition system having a speech processor that is trained to recognize speech by considering (1) a raw microphone signal that includes an echo signal and (2) different types of echo information signals from an echo cancellation system (and optionally different types of ambient noise suppression signals from a noise suppressor). The different types of echo information signals may include those used for echo cancelation and those having echo information. The speech recognition system may convert the raw microphone signal and different types of echo information signals (and optional noise suppression signals) into spectral features in the form of a vector, and a concatenator to combine the feature vectors into a total vector (for a period of time) that is used to train the speech processor, and during use of the speech processor to recognize speech.

21 Claims, 5 Drawing Sheets

(56) References Cited

U.S. PATENT DOCUMENTS

| | | | |
|---|---|---|---|
| 6,665,645 B1 | 12/2003 | Ibaraki et al. | |
| 6,725,193 B1 | 4/2004 | Makovicka | |
| 6,760,435 B1* | 7/2004 | Etter | H04B 3/23 |
| | | | 379/390.03 |
| 6,912,281 B2* | 6/2005 | Davis | H04B 3/23 |
| | | | 379/406.01 |
| 7,035,396 B1* | 4/2006 | Ubowski | H04M 9/082 |
| | | | 370/286 |
| 7,117,145 B1* | 10/2006 | Venkatesh | G10L 21/0208 |
| | | | 704/200 |
| 8,335,685 B2* | 12/2012 | Hetherington | G10L 25/78 |
| | | | 704/201 |
| 8,571,855 B2* | 10/2013 | Christoph | H03G 3/32 |
| | | | 381/71.1 |
| 9,286,883 B1* | 3/2016 | Ayrapetian | G10L 21/0208 |
| 2005/0010410 A1 | 1/2005 | Takiguchi et al. | |
| 2006/0002547 A1* | 1/2006 | Stokes | H04M 9/082 |
| | | | 379/406.14 |
| 2007/0189507 A1* | 8/2007 | Tittle | H04M 9/082 |
| | | | 379/406.01 |
| 2008/0152156 A1* | 6/2008 | Gao | H04M 9/082 |
| | | | 381/66 |
| 2010/0324420 A1* | 12/2010 | Snook | A61B 8/00 |
| | | | 600/443 |
| 2011/0208518 A1* | 8/2011 | Holtel | H04M 3/18 |
| | | | 704/226 |
| 2011/0228946 A1* | 9/2011 | Chen | G10L 19/012 |
| | | | 381/61 |
| 2011/0238417 A1 | 9/2011 | Yamamoto et al. | |
| 2014/0254816 A1* | 9/2014 | Kim | G10K 11/16 |
| | | | 381/71.11 |
| 2015/0003606 A1* | 1/2015 | Nemer | H04M 9/082 |
| | | | 379/406.01 |
| 2015/0112672 A1 | 4/2015 | Giacobello et al. | |
| 2016/0086600 A1* | 3/2016 | Bauer | G10L 15/16 |
| | | | 704/202 |

\* cited by examiner

ROBUST SPEECH RECOGNITION IN THE PRESENCE OF ECHO AND NOISE USING MULTIPLE SIGNALS FOR DISCRIMINATION

CROSS-REFERENCE TO RELATED APPLICATION

The application claims the benefit of the earlier filing date of U.S. Provisional Patent Application No. 62/171,965, filed Jun. 5, 2015 and incorporated herein by reference.

FIELD

A system and method for speech recognition of user speech by using speech recognition processor that is trained to recognize speech by considering (1) a raw microphone signal that includes an echo signal and (2) different types of echo information signals from an echo cancellation system (and optionally different types of ambient noise suppression signals from a noise suppressor), is described. Other embodiments are also described.

BACKGROUND

Electronic communication devices have become more sophisticated and advanced over the past several decades. For example, many traditional communication and mobile devices utilize one or more microphones to sense sound (e.g., user speech) from a near-end user.

The system may include a speech recognition system to recognize and output (e.g., as text) speech of the user received by the microphone. During speech recognition, the microphone can also pick up echo caused by sound played through a near-end speaker that is playing speech from a far-end user, music, or other audio. The microphone can also pick up ambient noise. The echo and/or noise can cause inaccurate or missed words in the speech recognition. Thus, it would be beneficial to remove or account for the effects of echo and noise on the speech recognition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Systems and methods are described for speech recognition of user speech by using a speech recognition system having a speech processor that is trained to recognize speech by considering (1) a raw microphone signal that includes an echo signal and (2) different types of echo information signals from an echo cancellation system (and optionally different types of ambient noise suppression signals from a noise suppressor). The different types of echo information signals may include those used for echo cancelation and those having echo information. The (optional) different types of ambient noise suppression signals may include those from a noise suppressor. The speech recognition system may include converters to convert the raw microphone signal and different types of echo information signals (and optionally) different types of ambient noise suppression signals) into spectro-temporal features in the form of a feature vector, and a concatenator combines these feature vectors into a total vector (for a period of time) that is used to train the speech processor, and during use of the speech processor to recognize speech.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Speech recognition of user speech in a microphone signal of an electronic device can be difficult in the presence of interfering echo or noise from a nearby loudspeaker (and ambient noise). Some embodiments may echo-cancel or echo-suppress the microphone signal (e.g., using an echo cancellation system) being sent to the speech recognition system prior to performing speech recognition.

Alternative embodiments may process the input microphone signal for echo using an echo cancellation system (and optionally for ambient noise using a noise suppressor system), and send all of the signals (e.g., the microphone signal and different types of echo information signals from the echo cancellation system and optionally different types of ambient noise suppression signals from a noise suppressor) to the "back-end" speech recognizer (e.g., to perform processing using or considering the output of the echo cancellation and noise suppressor systems). The different types of echo information signals may include those used for echo cancelation and those having echo information. The (optional) different types of ambient noise suppression signals may include those from a noise suppressor. The speech recognizer has been trained to incorporate all of the signals (including the additional pieces of echo (and optionally noise) information) in determining speech recognition.

Figure 1:
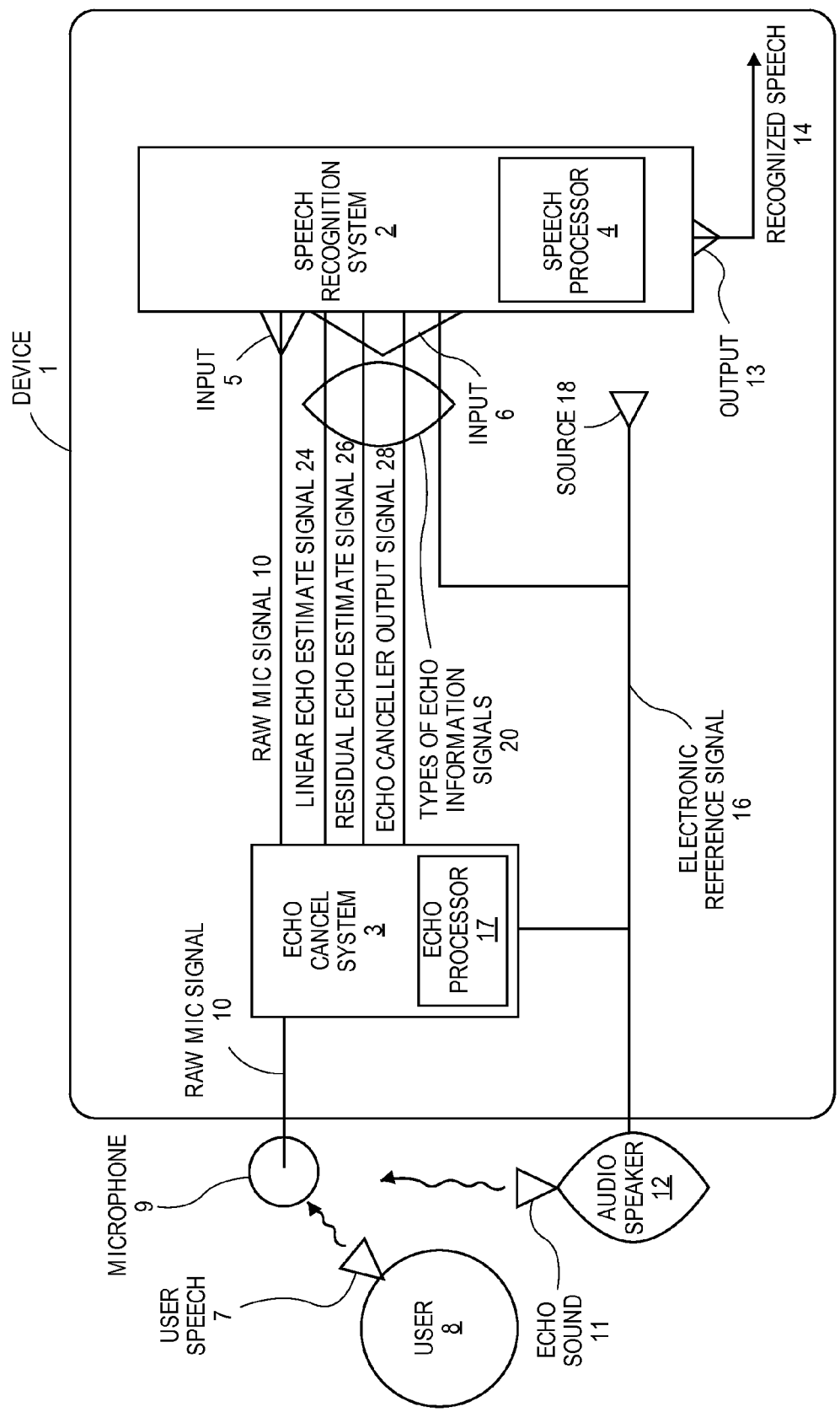
FIG. 1 shows embodiments of an electronic device having a speech recognition system (SRS) for speech recognition of user speech by using speech recognition processor that is trained to recognize speech by considering (1) a raw microphone signal that includes an echo signal and (2) types of echo information signals, including those from an echo cancel system (and optionally different types of ambient noise suppression signals from a noise suppressor).

FIG. 1 shows embodiments of an electronic device having a speech recognition system (SRS) for speech recognition of user speech by using speech recognition processor that is trained to recognize speech by considering (1) a raw microphone signal that includes an echo signal and (2) types of echo information signals, including those from an echo cancellation systems (and optionally different types of ambient noise suppression signals from a noise suppressor). FIG. 1 shows electronic device 1 having speech recognition system (SRS) 2, echo cancellation system 3, input microphone 9, source of electronic signal 18 and output speaker 12. System 3 receives raw microphone signal 10 and electronic reference signal 16. In some embodiments, system 3 includes (optionally) an ambient noise suppression system or "suppressor"). Signal 10 may be a raw microphone signal output by microphone 9 that includes user speech 7 of user 8, and an echo signal derived from or received from echo sound 11 output by speaker 12 playing signal 16 (and optionally ambient noise).

System 3 outputs raw microphone signal 10 to input 5 of system 2, and outputs some of different types of echo information signals 20 (e.g., "some of" does not include or exclude signal 16) to input 6 of system 2. Source 18 outputs signal 16 of different types of echo information signals 20 to input 6 of system 2. In some cases, signal 16 is not received but an estimate of the output of speaker 12 (or of signal 16) is derived from output of a reference microphone that hears sound 11. In some cases, signals 20 (optionally) include different types of ambient noise suppression signals from a noise suppressor that is part of system 3.

In some cases, system 3 includes a microphone input to receive the raw microphone signal 10, a electronic reference signal input to receive the electronic reference signal 16, echo processor 17 to use the raw microphone signal 10 and the electronic reference signal 16 to produce signals 20. System 3 may include an output to output raw microphone signal 10 and some of signals 20. In the embodiments shown, system 3 outputs linear echo estimate signal 24, residual echo estimate signal 26, and the echo canceller output signal 28. However, signals 20 may include fewer or additional signals as noted herein.

Speech recognition system (SRS) 2 receives raw microphone signal 10, different types of echo information signals 20 and electronic reference signal 16. FIG. 1 shows device 1 having SRS 2 for speech recognition of user speech 7 of user 8 by using speech recognition processor 4 that is trained to recognize speech by using or considering (1) a raw microphone signal 10 from microphone 9 that includes user speech signal (based on hearing speech 7) and an echo signal (based on hearing sound 11) and (2) types of echo information signals 20 (including types of echo information signals from echo cancel system 3) (and optionally different types of ambient noise suppression signals from a noise suppressor that may be part of system 3).

In some cases, device 1 may represent a mobile, portable or fixed location electronic computing device or telephone. In some cases, device 1 may represent one of a mobile telephone communications device, a smart phone, a personal digital media player, a tablet computer, a notebook computer, a mobile computing device, a mobile phone, a desktop phone, a desktop computer, and a compact desktop computer.

Microphone 9 may represent one or more of any type of acoustic-to-electric transducer or sensor, including a micro-electrical-mechanical system (MEMS) microphone, a piezo-electric microphone, an electret condenser microphone, or a dynamic microphone.

Speaker 12 may represent one or more of any type of electric-to-acoustic transducer, audio speaker or loudspeaker. Speaker 12 may produce sound in response to electronic reference signal 16 provided by source 18 of device 1.

In some cases, speaker 12 represents more than one transducer or more than one speaker and signal 16 represents more than one signal (e.g., one signal for each transducer or speaker).

Echo cancellation system 3 may be an echo cancellation system that produces some types of echo information signals 20 (e.g., echo information and optionally noise information) using or based on receive raw microphone signal 10 having (1) a user voice signal based on user speech 7 or audio during a period of time; and (2) an echo (or noise) signal based on sound 11 produced by speaker 12 (e.g., of device 1) or other ambient noise, during that period of time. Echo cancellation system 3 may also produce those types of echo information signals 20 using or based on reference signal 16 received during that period of time.

Echo cancellation system 3 may be or include computer logic, circuitry, software, and/or hardware. In some cases, logic describes electronic hardware or circuitry combined with software.

In some cases, the echo cancellation system can be a single or multichannel system capable of processing multiple speaker and microphone signals to output multiple residual echo signals, multiple linear echo estimates, and multiple echo canceller output signals. The echo cancellation system may include a transform-domain adaptive filtering stage augmented with step-size control module(s), residual echo suppressor augmented with residual echo power estimator, double-talk detectors, echo gate, reference/input signal decorrelator, adaptive nonlinearity estimator, and various processors for computing data, signal, and time dependent statistics. Selection of a particular transform domain may be dependent on the number of inputs and outputs to the echo cancellation system and the underlying hardware/device.

One embodiment of the speech recognition system (SRS) 2 can be a combination of a Deep Neural Network (DNN) stage interfaced with a Hidden Markov Model (HMM) based architecture, which can be trained using context and language models to identify user speech segments. In some cases, the SRS can also be devised using a recurrent DNN (R-DNN) to better utilize temporal structure in the extracted feature vectors.

SRS 2 includes inputs 5 and 6; speech processor 4 and output 13 to output recognized speech 14. SRS 2 may be or include computer logic, circuitry, software, and/or hardware. Output 13 may represent a display, touch-screen, or other output capable of displaying or outputting words, text, phrases, numbers, emoticons, etc. Speech 14 (and output 54 noted below) may represent text or words, phrases, numbers, or emoticons, etc.

SRS 2 has input 5 to receive raw microphone signal 10 having a user voice (e.g., speech) signal based on (1) user speech 7 or audio during a period of time and (2) an echo (or noise) signal based on sound 11 produced by speaker 12 (e.g., of device 1) (and optionally ambient noise) during the period of time. In some cases, signal 10 is received at input 5 by speech recognition system (SRS) 2 from system 3. In other cases, it is received by system 2 from microphone 9 without going through system 3.

SRS 2 has input 6 to receive (e.g., simultaneously with input 1 receiving signal 10) a number of types of echo information signals 20, during the period of time noted above. Signals of types of signals 20 may include information derived from (e.g., related to) the echo signal of signal 10, by echo cancel system 3; and signal 16. Signals of types of signals 20 may optionally include different types of ambient noise suppression signals from a noise suppressor that may be part of system 3.

In particular, SRS 2 may simultaneously receive types of signals 20 (e.g., sent by system 3) that are three or more of the following types of signals to the speech processor: raw microphone signal(s), raw loudspeaker signals, microphone signals that capture loudspeaker signals, linear echo estimates (e.g., from the echo cancellation system), residual echo estimates (e.g., from the echo cancellation system), echo cancelled output (e.g., from the echo cancellation system), impulse responses (for convergence check and time alignment) (e.g., from the echo cancellation system), echo-cancelled signals (e.g., from the echo cancellation system), echo suppressed signals (e.g., from the echo cancellation system), echo gated signals (e.g., from the echo cancellation system). In some cases, types of signals 20 may only include three of the types above. In some cases, types of signals 20 may only include four of the types above. In other cases, types of signals 20 may only include five of the types above. Optionally, in addition to the signals mentioned above, signals 20 may include one or more different types of ambient noise suppression signals from a noise suppressor.

In some cases, SRS 2 may simultaneously receive types of signals 20 that are four or more of the types of signals above. In some case, types of signals 20 include at least electronic reference signals 16, linear echo estimate signals 24, residual echo estimate signals 26, and echo canceller output signals 28. In some case, training types of signals 20 may include only echo information signals 16, 24, 26 and 28. Optionally, in addition to the signals mentioned above, signals 20 may include one or more different types of ambient noise suppression signals from a noise suppressor.

SRS 2 can then process all of the received types of sent signals simultaneously, and also extract which ones of these sent signals carry (e.g., include) enough useful information to assist in speech recognition. Processing all of these types of sent signals simultaneously will make it much easier to identify words or phrases without compromising the integrity of the speech signal present in the microphone. In some cases, having the speech processor system process or consider the actual "raw" microphone signal 10 provides more accurate speech recognition that having it process the echo (and optionally noise) canceled signal (e.g., without processing or considering the actual "raw" microphone signal).

Processor 4 may be a trained speech recognition processor (e.g., a speech recognition engine or a deep neural network (DNN)) to recognize speech and/or produce recognized speech 14 (e.g., such as words, text, phrases, numbers, emoticons, etc.) based on or considering the raw microphone signal 10 and signals 20. Processor 4 may have been trained at least by simultaneously inputting a plurality of different samples of (e.g., using or by inputting the samples to processor 4 during training of or to train processor 4) ones of raw microphone signals 10, and a plurality of different samples of each of the plurality of types of echo information signals 20 (three or more of types of signals 20, as noted herein, and that may optionally include one or more different types of ambient noise suppression signals).

Various examples of "ones of" audio samples (e.g., user speech 7, echo sound 12 and optionally ambient noise) for training processor 4 can be generated by recording, voices, noise and echoes separately (e.g., to provide the "ones of" or "versions of" signals 10 and types of signals 20 noted herein for training) Various ones of the recordings can be simultaneously used (e.g., by being played back into microphone 9 and speaker 12) to train processor 4, such as by having the speech processor 4 consider "ones" of or "versions" of the signals 10 and types of signals 20 during the playback (e.g., by using or by inputting the "ones" of or "versions" of signals that result from the played back recordings to processor 4 during or to train processor 4). In some cases, mono, stereo and multi-channel echo control systems (and optionally noise suppressors) can be used simultaneously to provide all of the types of signals 20 sent to the speech processor (e.g., as noted above). In some embodiments, only one of a mono, stereo or multi-channel echo control system sends signals 20 to SRS 2. In other embodiments, only two of a mono, stereo or multi-channel echo control systems simultaneously send signals 20 to SRS 2. In some cases, the echo control system(s) may optionally also include one or more noise suppression systems.

In some examples, all the types of signals may be used in training and testing, and offer the speech recognition system a better chance of successfully identifying the user speech, rather than limit it to the traditional single-signal approach (e.g., where the speech recognizer does not process or consider the actual "raw" microphone signal 10 and the types of signals 20 sent to the speech processor, as noted above).

In some cases, processor 4 may have been trained on (e.g., by using or by inputting to processor 4 during or to train processor 4) three or more of the following types of signals 20: raw microphone signal(s), raw loudspeaker signals, microphone signals that capture loudspeaker signals, linear echo estimates (e.g., from the echo cancellation system), residual echo estimates (e.g., from the echo cancellation system), echo cancelled output (e.g., from the echo cancellation system), impulse responses (for convergence check) (e.g., from the echo cancellation system), echo-cancelled signals (e.g., from the echo cancellation system), echo suppressed signals (e.g., from the echo cancellation system), echo gated signals (e.g., from the echo cancellation system). In some cases, training types of signals 20 may only include three of the types above. In some cases, training types of signals 20 may only include four of the types above. In other cases, training types of signals 20 may only include five of the types above. Optionally, in addition to the signals mentioned above, signals 20 may include one or more different types of ambient noise suppression signals from a noise suppressor.

In some cases, training types of signals 20 may simultaneously train processor 4 with at least different ones of or versions of: electronic reference signals 16, linear echo estimate signals 24, residual echo estimate signals 26, and echo canceller output signals 28. In some cases, training types of signals 20 may include only echo information signals 16, 24, 26 and 28. Optionally, in addition to the signals mentioned above, signals 20 may include one or more different types of ambient noise suppression signals from a noise suppressor.

The different samples of ones of raw microphone signals may be those (e.g., a copy of or similar to) that are expected as signal 10 during use of device 1. The plurality of different samples of each of the plurality of types of echo information signals 20 may be those (e.g., a copy of or similar to) that are expected as types of echo information signals 20 during use of device 1. In some cases, the samples of ones of raw microphone signals and samples of each of the plurality of types of echo information signals 20 may be those (e.g., a copy of or similar to) that are expected to be sent to the processor during the same time period during use of device 1. Optionally, in addition to the signals mentioned above, signals 20 may include one or more different types of ambient noise suppression signals from a noise suppressor. Training processor 4 may be during or after manufacture but before sale or consumer use.

In some cases, SRS 2 or processor 4 may have a database storing all of the training data used to train processor 4. This database may identify the training data so processor 4 can correlate the training result (e.g., speech recognized) with the data and output speech 14.

In some cases, SRS 2 or processor 4 may have a large vocabulary processor to recognize speech of a large vocabulary; and a plurality of small vocabulary processors to recognize speech of a plurality of small vocabularies.

For one case, let us say processor 4 has a small vocabulary processor that is properly trained using signals 10 and 20 as noted herein to recognize speech (as output 14 or 54) that is "Hey Siri".

In a first example, in this case, say processor 4 receives signal 10 with what sounds like "Hey Siri"; an echo cancelled output from system 3 (e.g., an echo corrected version of signal 10) (and/or other signals of signals 20) that does not sound like or include "Hey Siri"; and reference signal 16 is zero or below an energy threshold (e.g., does not have enough power to produce "Hey Siri" with speaker 12). Here, although echo cancelled output does not include "Hey Siri", since reference signal 16 is zero, processor 4 may correctly determine or have confidence that the user did say "Hey Siri".

However, for another processor that only considered echo cancelled output which does not include "Hey Siri", it is likely that the other processor will determine that user did not say "Hey Siri". Thus, by processor 4 being trained with and having an input for raw signal 10 and reference signal 16, processor 4 is more accurate in this situation.

In a second example, in this case, say processor 4 receives signal 10 with what sounds like "Hey Siri"; an echo cancelled output from system 3 (and/or other signals of signals 20) that does not include "Hey Siri"; and reference signal 16 is not zero or has energy above a threshold (e.g., such as has enough power to produce "Hey Siri" in speaker 12). Here, processor 4 has higher confidence to correctly determine the user did say "Hey Siri" because the echo cancelled output does not include "Hey Siri"; and reference signal 16 is not zero.

In other words, for the other processor that only considered echo cancelled output, the two examples above are indeterminate and that processor will have the same output in both situations, likely providing the wrong recognition in one of them.

In a third example, in this case, say processor 4 receives signal 10 with what sounds like "Hey Siri"; an echo cancel output from system 3 that does sound like or include "Hey Siri"; a residual echo estimate from system 3 that has data at frequencies that do not sound like or include "Hey Siri"; and a linear echo estimate from system 3 that has data at frequencies that do sound like or include "Hey Siri". Here, although echo cancel output does (and other signals mentioned above) include "Hey Siri", since the linear echo estimate includes "Hey Siri", it may be likely that processor 4 will correctly determine or have confidence that the user did not say "Hey Siri".

However, for another processor that only considered echo cancel output which does include "Hey Siri", it is likely that the other processor will determine that the user did say "Hey Siri". Thus, by processor 4 being trained with and having an input for raw signal 10 and the linear echo estimate, processor 4 is more accurate in this situation.

In a fourth example, in this case, say processor 4 receives signal 10 with what sounds like "Bay Siri"; an echo cancel output from system 3 that does sound like or include "Bay Siri"; a residual echo estimate from system 3 that has data at frequencies that do not sound like or include "Hey Siri"; and a linear echo estimate from system 3 that has data at frequencies that do sound like or include "Bay". Here, although echo cancel output does include "Bay Siri" and not "Hey Siri", since the linear echo estimate includes "Bay", it may be likely that processor 4 will correctly determine or have confidence that the user did say "Hey Siri". For instance, "Bay Siri" in signal 10 may be the user saying "Hey Siri" corrupted with "Bay" coming out of speaker 12 at the same time as "Hey".

However, for another processor that only considered echo cancel output which does include "Bay Siri", it is likely that the other processor will determine that the user did not say "Hey Siri". Thus, by processor 4 being trained with and having an input for raw signal 10 and the linear echo estimate, processor 4 is more accurate in this situation.

In some cases, speaker 12 may be for outputting audio received from a far-end system, such as via a network, or phone connection. Speaker 12 may be for outputting audio received from source 18 of device 1, such as an audio codec, music recordings, voice recordings, automated voice, etc. In one embodiment the speaker 12 may be a speaker array that includes multiple transducers housed in device 1. The transducers may be any combination of full-range drivers, mid-range drivers, subwoofers, woofers, and tweeters to reproduce sound under the control of the applied electrical audio signal 16 coming from source 18 of device 1.

In some cases, echo sound 11 may be from a source other than speaker 12. It may be ambient noise not produced by device 1. In this case, signal 16 may not be considered by processor 4. In some of these cases, processor 4 may be trained with additional signals that exclude signal 16.

In other cases, the interfering sound 11 may be a combination of sound from speaker 12, as well as ambient noise. In this case, signal 16 is still useful to be considered by processor 4. A noise suppressor (NS) system may be used in addition to the echo chancel system in order to attenuate the ambient noise. The multiple outputs of the NS may include the noise-attenuated signal, as well as a separate estimate of the noise. Furthermore, in some cases, the noise suppression system (or suppressor) described herein represents multiple NS systems may are used in parallel, each using a different parameter setting, and each producing its own set of noise suppression output signals (e.g., as noted above). The entire ensemble of output signals from the multiple noise suppression systems or settings may also be combined with the echo cancel output signals in the concatenator 50 system (see FIG. 2), to be processed simultaneously by the SRS 2.

Figure 2:
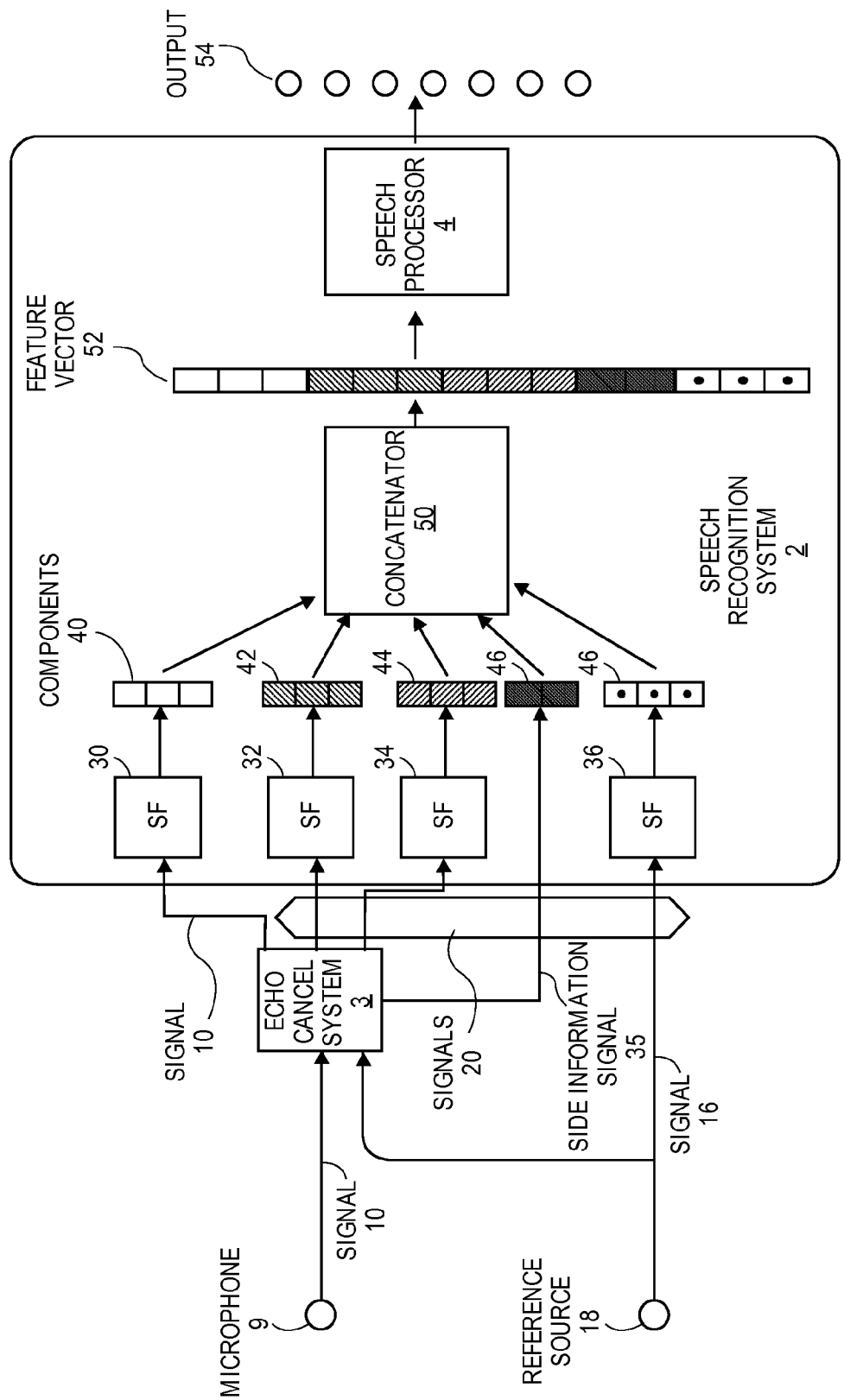
FIG. 2 shows an example of how an echo cancellation (EC) system (and optionally different types of ambient noise suppression signals from a noise suppressor) interfaces with a speech processor or deep neural network (DNN) of a speech recognition system.

FIG. 2 shows an example of how an echo cancellation module (EC) interfaces with a deep neural network (DNN)) of a speech recognition module. In some cases, FIG. 2 shows an example of how the echo cancellation system 3 (e.g., an EC module) (optionally, including a noise suppressor) interfaces with (e.g., outputs signals received by) speech processor 4 (e.g., a deep neural network (DNN)) and SRS 2 (e.g., a SR module).

FIG. 2 shows system 3 receiving a signal 10 from microphone 9 and signal 16 from reference source 18. System 3 is shown outputting signals 10 and 20. In these embodiments, signals 20 include side information signal 35 (which may be considered to be part of signals 20, but not shown in FIG. 1). Optionally, in addition to the signals mentioned above, signals 20 may include one or more different types of ambient noise suppression signals from a noise suppressor.

SRS 2 is shown receiving signals 10 and 20 from system 3; and converting them to spectral features 30, 32, 34 and 36. Signal 16 provides spectral feature (SF) 36. SRS 2 is shown having concatenator 50 which receives spectral features 30, 32 and 34; and side information signal 35. Concatenator 50 concatenates spectral features 30, 32 and 34; and side information signal 35 into total feature vector 52, which is received by processor 4. Processor 4 speech processes vector 52 (such as using a DNN of processor 4) and produces output 54 (or output 14) based on or considering part of all of vector 52. The concatenator can simply stack the individual features vectors on top of each other or employ a more sophisticated windowed/weighted approach of generating an optimal total feature vector. For some embodiments, the terms "spectral feature" may be or represent a "spectral-temporal feature" (STF).

Optionally, in addition to the types signals 20 mentioned above, signals 20 may include one or more different types of ambient noise suppression signals from a noise suppressor that are received by SRS 2, converted to additional spectral features (e.g., vectors not shown) and concatenated by concatenator 50 with the other spectral features or vectors into vector 52.

In some cases, FIG. 2 shows raw microphone signal 10 converted into spectral features 30; some of different types of echo information signals 20 converted into spectral features 32 and 34; side information as signal 35; and signal 16 converted into spectral feature 36. In some cases, features 32 and 34 represent more than two spectral features such as by representing spectral features of three or more, only three, only four or only five of the types of signals 20, as mentioned regarding processor 4 (or system 2 or 3) for FIG. 1. In some cases, features 32 and 34 represent more than two spectral features such as by representing three spectral features of signals 24, 26 and 28. Optionally, in addition to the features mentioned above, the features may include those converted from one or more different types of ambient noise suppression signals from a noise suppressor.

In some cases, FIG. 2 does not include raw microphone signal 10 converted into a spectral features 30. In this case, signal 10 may be replaced with one of types of signals 20, so that some of different types of echo information signals 20 are converted into spectral features 30, 32 and 34; side information as signal 35; and signal 16 converted into spectral feature 36. Here, features 30, 32 and 34 represent spectral features of three or more, only three, only four or only five of the types of signals 20, as mentioned regarding processor 4 (or system 2 or 3) for FIG. 1. In some cases, features 30, 32 and 34 represent spectral features of signals 24, 26 and 28. Optionally, in addition to the features mentioned above, the features may include those converted from one or more different types of ambient noise suppression signals from a noise suppressor.

Feature 30 is shown having vector 40, such as having three vector components. Feature 32 is shown having vector 42, such as having three vector components. Feature 34 is shown having vector 44, such as having three vector components. Side information 35 is shown having vector 45 having two vector components. Feature 36 is shown having vector 46 having three vector components. It can be appreciated that other numbers or types of spectral features, side information, and features of the reference source can be used, as compared to those shown. Optionally, in addition to the vectors mentioned above, the vectors may include those converted from one or more different types of ambient noise suppression signals from a noise suppressor.

Concatenator or stack 50 is shown receiving vectors 40, 42, 44, 45 and 46. Suppose each vector has L coefficients, and there are N total vectors. Consequently, the full concatenated feature vector received at concatenator 50 may include N*L coefficients of vectors 40, 42, 44 and 46. Concatenator 50 outputs the concatenation or stack of these vectors as N*L samples stacked end-to-end, shown as total feature vector 52. Optionally, in addition to the vectors mentioned above, the vectors may include those converted from one or more different types of ambient noise suppression signals from a noise suppressor.

Concatenator 50 outputs vector 52 to processor 4, such as for training of processor 4, or for speech recognition during use. Processor outputs output 54 which may be used for training or for speech recognition during use (e.g., as recognized speech 14).

In some cases, the concatenator functions by stacking coefficients from multiple vectors into a single, longer vector. Suppose one vector is defined as the sequence [F1, F2, F3], and another vector is defined as [G1, G2, G3]. The concatenation of these two vectors is the double-length vector [F1, F2, F3, G1, G2, G3].

In some cases, the training of the SRS is carried out using stochastic gradient descent relying on back propagation. Training of the SRS can be initialized using random or restricted Boltzmann machine (RBM)-based initialization.

In some embodiments, processor 4 is also trained with a "temporal context." This means each of the vectors 40, 42, 44, and 46 is buffered or saved over a time span of the K most recent frames. Thus, in this case, the overall concatenated feature vector 52 may be N*L (e.g., in height)*K (e.g., in length of time). In cases of a single frame or K frames, the side information 35 may be added to the N*L samples or N*L*K samples, respectively, thus adding M samples to each.

Thus, feature vector 52 may represent a training input to processor 4, such as to train the processor prior to packaging or sale of device 1. After training, during testing or use, feature vector 52 may represent a vector produced by user speech 7 or echo sound 11 (or optionally ambient noise) in a test or user situation. During training, speech 7 or sound 11 (or optionally ambient noise) may represent speech produced as described herein for training (e.g., such as from a recording or recordings) and associated with data in a database storing the training data used to train processor 4.

As noted above, SRS 2 or processor 4 may have a database storing all of the training data used to train processor 4. This database may identify the training data of feature vector 52 so processor 4 can correlate the training result (e.g., speech recognized during training or use) with the training data and output (e.g., output 54 or recognized speech 14).

According to embodiments, one key operation of the interface between system 3 and processor 4 may be the concatenation (or stack) operation (e.g., by concatenator 50), which combines multiple output signals of system 3 (e.g., signals 10 and 20, which are converted to vectors 40, 42, 44, 45 and 46 (and optionally vectors converted from one or more different types of ambient noise suppression signals from a noise suppressor)) into a single vector 52 to be received by processor 4 (e.g., a DNN) so that processor 4 receives all signals simultaneously (e.g., as vector 52 having information from signals 10 and 20 for a certain time period). In some cases, processor 4 receives vector 52, which has information from or derived from signals 10 and 20 during or for a same period of time (e.g., an audio block of time or a span of time as noted herein).

The strength of this approach is that processor 4 can be trained during design and development on (e.g., to consider) the multiple signals simultaneously (concantenated vector 52). In addition, due to this training, during use, processor 4 can recognize or determine speech (e.g., as output 14 or 54) in user speech 7 based on or by considering the multiple signals simultaneously (concantenated vector 52) received during use of device 1. Therefore, processor 4 is able to exploit complex interrelations between the received signals (e.g., vectors 40, 42, 44, 45 and 46 as received simultaneously (and optionally vectors converted from one or more different types of ambient noise suppression signals from a noise suppressor)). Such exploitation is superior to the alternative of training a separate processor or DNN for each of the different signals (e.g., non concatenated signals or vectors 40, 42, 44, 45 and 46 (and optionally vectors converted from one or more different types of ambient noise suppression signals from a noise suppressor)), because separate processors or DNNs can not learn about relationships between simultaneously received signals, coefficients or vectors of vector 52 (e.g., received at the same time). Such exploitation may be unexpected or counter intuitive when comparing to another speech recognition processor that only considers an echo cancel output or that does not consider multiple types of echo information signals and vectors (and optionally, different types of noise cancelation information).

In some cases, when processor 4 is presented multiple signals simultaneously (e.g., as vector 52), it is able to implicitly learn (and can consider during use to recognize or determine speech) complex relationships such as:

a. De-noising,
b. Residual echo suppression, and
c. Comparisons between signals, which enable the system to carry out robust speech recognition in noisy and double-talk cases.

The output of processor 4 (e.g., output 14 or 54) may be a posterior distribution over senones, phonemes, triphones, words, or phrases (e.g., speech 14). Therefore, processor 4 learns (and can consider during use to recognize or determine speech) the implicit relationships that are most useful to the task at hand, such as simultaneous relationships between signals, coefficients or vectors of vector 52 (e.g., received at the same time). Learning such implicit relationships may be unexpected or counter intuitive when comparing to another speech recognition processor that only considers an echo cancel output or that does not consider a total or simultaneous vector that includes different types of echo information signals (and optionally, different types of noise cancelation information).

As noted, the input to processor 4 may be a concatenation of feature vectors (e.g., represented by vector 52). By "vector" we may mean a finite-length (of time) sequence of samples (e.g., components, such as components 40-46 (and optionally components of vectors converted from one or more different types of ambient noise suppression signals from a noise suppressor)). In some cases, system 3 processes audio (e.g., signals 10 and 16 into system 3) in blocks of 20 milliseconds (e.g., as a periodic sequence of 20 millisecond time periods). However, this may be in a range of between 10 and 30 milliseconds. It may be 10 or 30 milliseconds, or other periods of time as known for speech recognition or processing. Each block of output audio (e.g., signals 10 and 20 from system 3) may get converted by SRS 2 to a feature vector (e.g., vectors 40-52 (and optionally vectors converted from one or more different types of ambient noise suppression signals from a noise suppressor)) by way of a Spectral Features (SF) transform or a spectral-temporal feature (STF) transform. Some examples of spectral transforms that may be used are mel-frequency cepstral coefficients or filter-bank features. In some cases, known transforms can be used. In some cases, in order to extract spectro-temporal features, a given signal can be partitioned into multiple complex or real time-series corresponding to various center frequencies using e.g., gamma tone filters, poly-phase filter-banks, windowed Short-Time Fourier Transform (STFT), etc. In some cases, thereafter, spectral feature transformations can be applied to these multiple complex and time series to extract compact representative information in the form of a feature vector.

As noted, processor 4 may also be trained with (and can consider during use to recognize or determine speech) "temporal context." This refers to a feature vector concatenation (e.g., similar to vector 52 but) over a span of time, such as 200-500 milliseconds, which is greater than the audio block size (e.g., 20 milliseconds or as noted herein). Thus, suppose the feature vector size is L digital samples. If system 3 generates N output signals, then the full concatenated feature vector 52 consists of the N vectors stacked end-to-end, for a total of N*L samples (optionally, with an added M size sample from side information 35). For processor 4 training (and possible consideration during use to recognize or determine speech), the concatenation across different signals (e.g., some or all of vectors 40-46 (and optionally vectors converted from one or more different types of ambient noise suppression signals from a noise suppressor)), is different from, yet compatible with, temporal concatenation. If the temporal context span is K frames, then the overall concatenated feature vector length may be N*L*K samples.

As noted, in some cases, system 3 can also generate "side information" 35 which may be useful for training and consideration during use to recognize speech. The side information may have a vector size different from the spectral feature vector size. If the side information 35 is or has M samples per audio block size, then the full concatenated vector length of vector 52 may be (N*L+M)*K.

It may also be advantageous to temporally align the multiple signals 10 and 20 prior to concatenation. This can be done by system 3 or at the input of SRS 2 (e.g., based on information in signals of types of signals 20). This alignment may synchronize the components in vector 52 with respect to time so that the vectors of vector 52 represent data of the same time period (e.g., in or from signals 10 and 20).

Alignment may compensate for known delays between the multiple signals, such as between the microphone signal 10 and the reference signal 16.

In some embodiments, spectral features 30, 32 34 and 36 (and optionally features converted from one or more different types of ambient noise suppression signals from a noise suppressor) represent spectral feature transformers to or that transform the signals (e.g., signals 10 and 20) into spectral features having feature vectors 40-46 (and optionally vectors converted from one or more different types of ambient noise suppression signals from a noise suppressor). In some cases, concatenator 50 may combine the feature vectors 40-46 (and optionally vectors converted from one or more different types of ambient noise suppression signals from a noise suppressor) into a total vector 52 that represents the raw microphone signal 10 and different types of echo information signals 20 for a period of time, such as for single block or span of time. In some cases, the spectral feature transformers and the concatenator are used to train the speech recognition processor based on recorded audio information, or are used to recognize user speech while using the system. In some cases, they are used to train the speech recognition processor based on recorded audio information, and are used to recognize user speech while using the system.

Some portions of the preceding detailed descriptions have been presented in terms of processes, conversions, echo cancelation systems, echo processors, noise suppressors, speech recognition systems, speech recognition processors, DNNs, concatenators (and concatenation), spectral features (and transforms), algorithms and symbolic representations of operations on audio signals, electronic signals and data (e.g., bits) within an electronic device (e.g., system 2 or device 1). These descriptions and representations are the ways used by those skilled in the electronic device, hardware, software and data processing arts to most effectively convey the substance of their work to others skilled in the art. These descriptions are here, and generally, conceived to be a self-consistent sequence of operations leading to a desired result. These descriptions are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein (e.g., of system 2 or device 1). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Embodiments of the invention (e.g., processes or methods performed by system 2 or device 1) depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

To conclude, various aspects of a speech recognition system having a speech processor that is trained to recognize speech by considering (1) a raw microphone signal that includes an echo signal and (2) different types of echo information signals from an echo cancellation system (and optionally different types of ambient noise suppression signals from a noise suppressor) have been described. As explained above, an embodiment of the invention (e.g., system 2 or device 1) may be housed in a mobile, portable or fixed location electronic device such as a mobile telephone communications device, a smart phone, a personal digital media player, a tablet computer, a notebook computer, a compact desktop computer, a desktop phone, a desktop computer, and a compact desktop computer.

Figure 3:
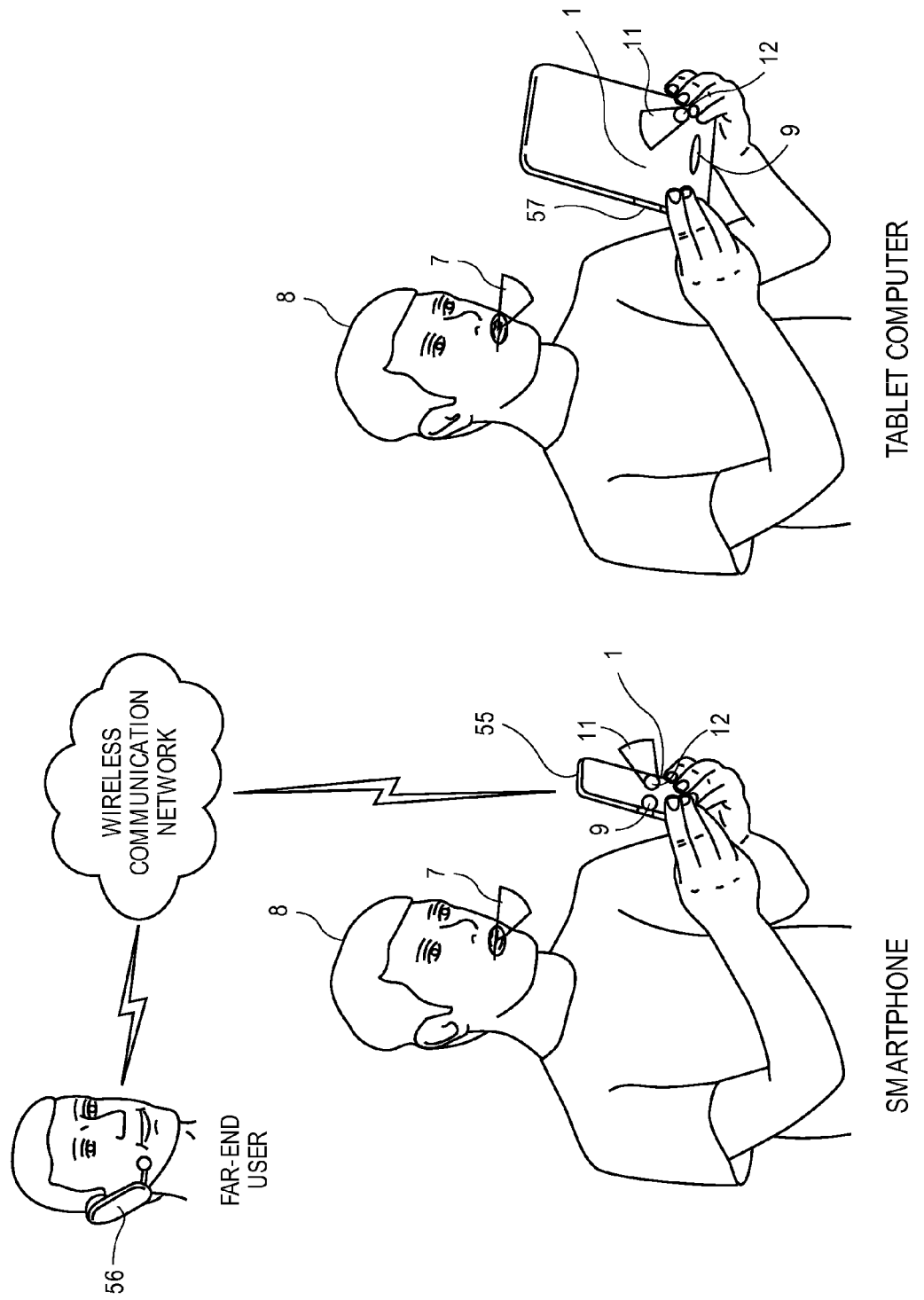
FIG. 3 shows an example of instances of portable consumer electronics devices in which embodiments of the speech recognition system may be implemented.

For example, FIG. 3 depicts instances of portable consumer electronics devices in which embodiments of the invention may be implemented. As seen in FIG. 3, device 1 may be or may not be included in a speakerphone unit that is integrated within a consumer electronic device such as a smartphone 55 with which a user can conduct a call with a far-end user of a communications device 56 over a wireless communications network. In another example, device 1 may be mounted to a PCB that is integrated within the housing of tablet computer 57. These are just examples of where device 1 may be used. It is contemplated, however, that device 1 may be used with any type of electronic device in which it is desired to have a speech recognition system having a speech processor that is trained to recognize speech by considering (1) a raw microphone signal that includes an echo signal and (2) different types of echo information signals from an echo cancellation system (and optionally different types of ambient noise suppression signals from a noise suppressor), such as in a lap top computing device or portable headset such as device 56.

Figure 4:
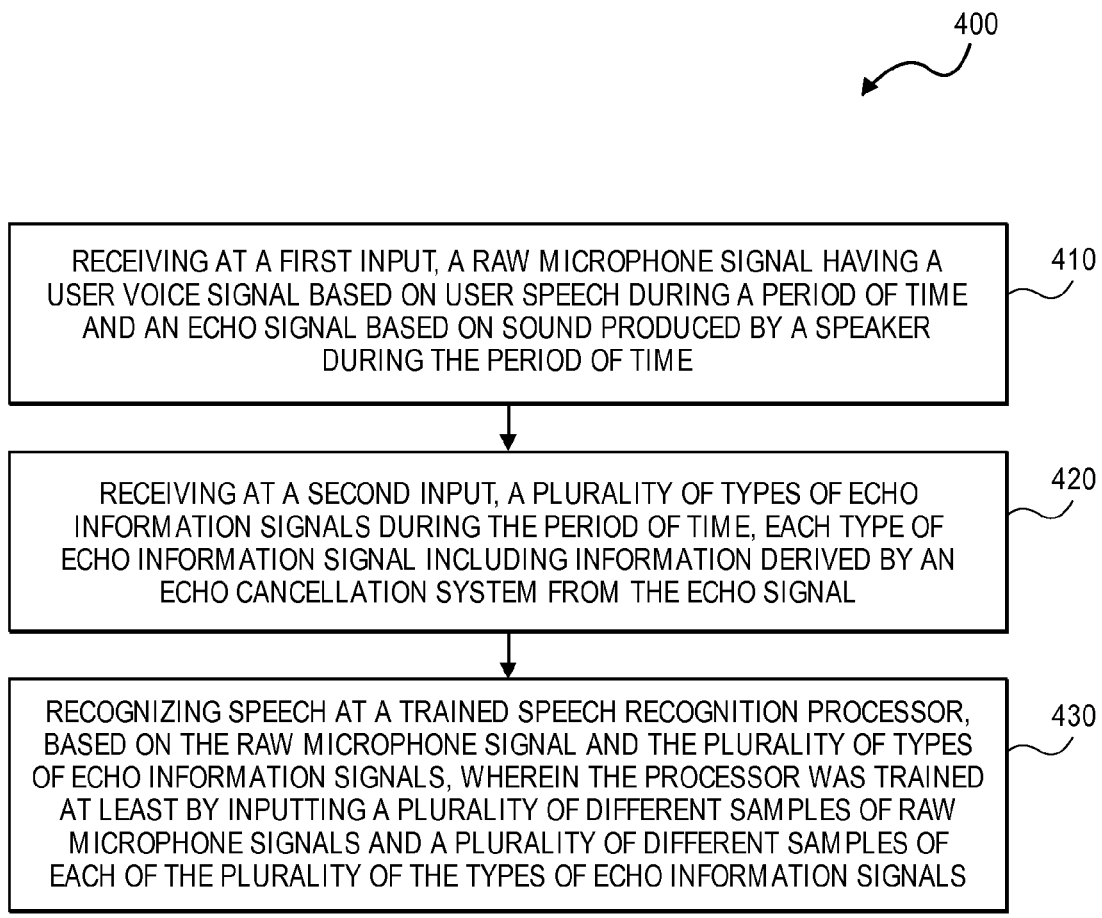
FIG. 4 depicts an example process for speech recognition, such as using a speech recognitions system trained at least by inputting a plurality of different samples of raw microphone signals and a plurality of different samples of each of the plurality of types of echo information signals.

FIG. 4 depicts example process 400 for speech recognition, such as using a speech recognitions system trained at least by inputting a plurality of different samples of raw microphone signals and a plurality of different samples of each of the plurality of types of echo information signals. Process 400 may describe a process of using device 1 or SRS 2 to perform speech recognition (e.g., as noted herein).

Block 410 includes receiving (e.g., at input 5) raw microphone signal 10 having a user voice signal based on user speech during a period of time and an echo signal based on sound produced by speaker 12 during the period of time.

Block 420 includes receiving (e.g., at input 6) a plurality of types of echo information signals 20 during the period of time (e.g., simultaneously with block 410), each type of echo information signal including information derived by an echo cancellation system 3 from the echo signal.

Block 430 includes recognizing speech at trained processor 4, based on the raw microphone signal 10 and the plurality of types of echo information signals 20, wherein processor 4 was trained at least by inputting a plurality of different samples of raw microphone signals and a plurality of different samples of each of the plurality of the types of echo information signals.

Blocks 410 and 420 may include speaker 12 receiving an electronic reference signal and producing the sound produced by the speaker in response to the speaker receiving an electronic reference signal 16. The types of echo information signals 20 may include the electronic reference signal, a linear echo estimate signal, a residual echo estimate signal, and an echo canceller output signal. The types of echo information signals 20 may be derived by the echo cancellation system from the echo signal, the raw microphone signal, and the reference signal.

Blocks 410 and 420 may also include receiving raw microphone signal 10 at a microphone input of the echo cancelation system 3; receiving the electronic reference signal 16 at an electronic reference signal input of the echo cancelation system; echo processor 17 of the echo cancellation system using the raw microphone signal and the electronic reference signal to produce the linear echo estimate signal, the residual echo estimate signal, and the echo canceller output signal. Blocks 510 and 520 may also include an output of system 3 outputting the linear echo estimate signal, the residual echo estimate signal, and the echo canceller output signal to input 6.

Block 430 may include using speech recognition processor 4 that has a deep neural network that was trained using: a plurality of different ones of electronic reference signals, a plurality of different ones of linear echo estimate signals, a plurality of different ones of residual echo estimate signals, and a plurality of different ones of echo canceller output signals.

Block 430 may include recognizing speech at the trained speech recognition processor 4 by having spectral feature transformers (e.g., transformers 30-36) transforming the raw microphone signal 10 and different types of echo information signals 20 into spectral features in the form of feature vectors; and a concatenator 50 combining the feature vectors into a total vector 52 that represents the raw microphone signal 10 and different types of echo information signals 20 for a period of time.

Blocks 420 and 430 may optionally include a noise suppressor (e.g., of system 3) producing different types of ambient noise suppression signals from the raw microphone signal, and the plurality of types of echo information signals include the different types of ambient noise suppression signals.

In some embodiments, only blocks 420 and 430 of process 400 are performed. In some embodiments, only block 430 of process 400 is performed.

Figure 5:
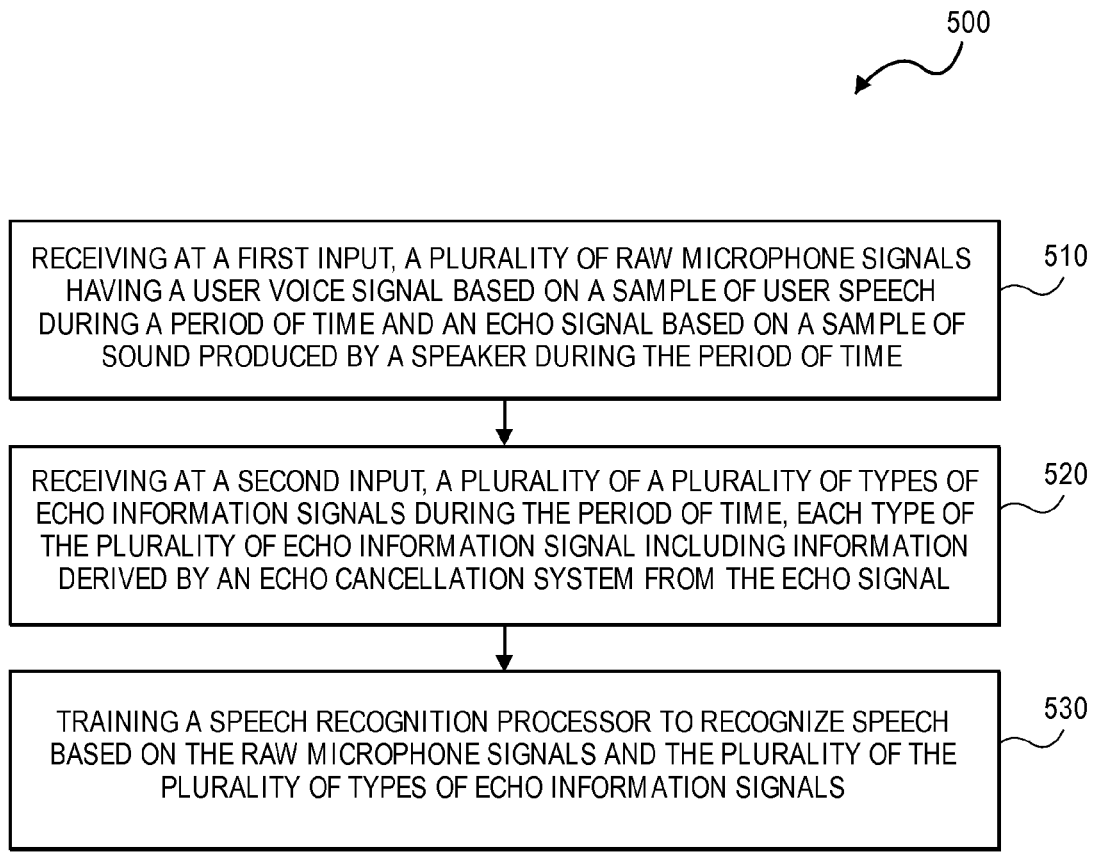
FIG. 5 depicts an example process for training a speech recognition system (SRS) at least by inputting a plurality of different samples of raw microphone signals and a plurality of different samples of each of the plurality of types of echo information signals.

FIG. 5 depicts example process 500 for training a speech recognition system (SRS) at least by inputting a plurality of different samples of raw microphone signals and a plurality of different samples of each of the plurality of types of echo information signals. Process 500 may describe a process of training device 1 or SRS 2 to perform speech recognition (e.g., as noted herein).

Block 510 includes receiving (e.g., at input 5) a plurality of raw microphone signal 10 having a user voice signal based on user speech during a period of time and an echo signal based on sound produced by speaker 12 during the period of time.

Block 520 includes receiving (e.g., at input 6) a plurality of types of echo information signals 20 during the period of time (e.g., simultaneously with block 510), each type of the plurality of echo information signal including information derived by an echo cancellation system 3 from the echo signal.

Block 530 includes training processor 4 to recognize speech based on the raw microphone signals 10 and the plurality of types of echo information signals 20.

Blocks 510 and 520 may include speaker 12 receiving a plurality of electronic reference signals 16 and producing the plurality of raw microphone signals 10 in response to the speaker receiving the electronic reference signals 16. The plurality of types of echo information signals 20 may include the plurality of electronic reference signals 16, a plurality of linear echo estimate signals, a plurality of residual echo estimate signals, and a plurality of echo canceller output signals. The plurality of types of echo information signals 20 may be derived by the echo cancellation system from the plurality of echo signals, the plurality of raw microphone signals, and the plurality of reference signals.

Blocks 510 and 520 may also include receiving raw microphone signals 10 at a microphone input of the echo cancelation system 3; receiving the electronic reference signals 16 at an electronic reference signal input of the echo cancelation system; echo processor 17 of the echo cancellation system using the raw microphone signals and the electronic reference signals to produce the linear echo estimate signals, the residual echo estimate signals, and the echo canceller output signals. Blocks 510 and 520 may also include an output of system 3 outputting the linear echo estimate signals, the residual echo estimate signals, and the echo canceller output signals to input 6.

Block 530 may include speech recognition processor 4 having a deep neural network (DNN) and training the DNN using: the plurality of electronic reference signals, the plurality of linear echo estimate signals, the plurality of residual echo estimate signals, and the plurality of echo canceller output signals.

Block 530 may include the trained speech recognition processor 4 having spectral feature transformers (e.g., transformers 30-36) transforming the raw microphone signals 10 and plurality of different types of echo information signals 20 into spectral features in the form of feature vectors; and a concatenator 50 combining the feature vectors into a total vector 52 that represents the raw microphone signals 10 and the plurality of different types of echo information signals 20 for a period of time.

Block 530 may include the spectral feature transformers and the concatenator training processor 4 using or based on recorded audio information.

Blocks 520 and 530 may optionally include a noise suppressor (e.g., of system 3) producing a plurality of different types of ambient noise suppression signals from the raw microphone signals, and the plurality of types of echo information signals 20 for training include the plurality of different types of ambient noise suppression signals.

In some embodiments, only blocks 520 and 530 of process 500 are performed. In some embodiments, only block 530 of process 500 is performed.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although embodiments of the speech recognition system described in FIGS. 1-5 include systems 2 and 3; in some cases, device 1 may only include SRS 2, while system 3 (and microphone 9 and speaker 12) are external to or not part of (but interfaced with) device 1. The description is thus to be regarded as illustrative instead of limiting.

What is claimed is:

1. A speech recognition system (SRS) comprising:
   a first input to receive a raw microphone signal having a user voice signal based on user speech during a period of time and an echo signal based on sound produced by a speaker during the period of time;
   a second input to receive a plurality of types of echo information signals during the period of time, each type of echo information signal including information derived from the echo signal by an echo cancellation system; and
   a trained speech recognition processor to recognize speech based on the raw microphone signal and the plurality of types of echo information signals, wherein the processor was trained at least by inputting a plurality of different samples of raw microphone signals and a plurality of different samples of each of a plurality of the types of echo information signals.

2. The system of claim 1, wherein the sound produced by the speaker is produced by the speaker in response to the speaker receiving an electronic reference signal; and
   wherein the plurality of types of echo information signals include the electronic reference signal, a linear echo estimate signal, a residual echo estimate signal, and an echo canceller output signal.

3. The system of claim 2, further comprising the echo cancellation system comprising:
   a microphone input to receive the raw microphone signal;
   an electronic reference signal input to receive the electronic reference signal;
   an echo processor to use the raw microphone signal and the electronic reference signal to produce the linear echo estimate signal, the residual echo estimate signal, and the echo canceller output signal; and
   an output to output the linear echo estimate signal, the residual echo estimate signal, and the echo canceller output signal, to the second input.

4. The system of claim 1, wherein the speech recognition processor includes a deep neural network that was trained using:
   a plurality of different ones of electronic reference signals,
   a plurality of different ones of linear echo estimate signals,
   a plurality of different ones of residual echo estimate signals, and
   a plurality of different ones of echo canceller output signals.

5. The system of claim 1, wherein the speech recognition processor includes:
   spectral feature transformers to transform the raw microphone signal and different types of echo information signals into spectral features in the form of feature vectors; and
   a concatenator to combine the feature vectors into a total vector that represents the raw microphone signal and different types of echo information signals for a period of time.

6. The system of claim 5, wherein the spectral feature transformers and the concatenator are one of (1) used to train the speech recognition processor based on recorded audio information, or (2) used to recognize user speech while using the system.

7. The system of claim 1, wherein the plurality of types of echo information signals include different types of ambient noise suppression signals from a noise suppressor.

8. A method of speech recognition comprising:
   receiving at a first input, a raw microphone signal having a user voice signal based on user speech during a period of time and an echo signal based on sound produced by a speaker during the period of time;
   receiving at a second input, a plurality of types of echo information signals during the period of time, each type of echo information signal including information derived by an echo cancellation system from the echo signal; and
   recognizing speech at a trained speech recognition processor, based on the raw microphone signal and the plurality of types of echo information signals, wherein the processor was trained at least by inputting a plurality of different samples of raw microphone signals and a plurality of different samples of each of a plurality of the types of echo information signals.

9. The method of claim 8, further comprising:
   the speaker receiving an electronic reference signal; and
   the speaker producing the sound produced by the speaker in response to the speaker receiving an electronic reference signal,
   wherein the plurality of types of echo information signals include the electronic reference signal, a linear echo estimate signal, a residual echo estimate signal, and an echo canceller output signal, and
   wherein the plurality of types of echo information signals are derived by the echo cancellation system from the echo signal, the raw microphone signal, and the reference signal.

10. The method of claim 9, further comprising:
    receiving the raw microphone signal at a microphone input of the echo cancelation system;
    receiving the electronic reference signal at an electronic reference signal input of the echo cancelation system;
    an echo processor of the echo cancellation system using the raw microphone signal and the electronic reference signal to produce the linear echo estimate signal, the residual echo estimate signal, and the echo canceller output signal; and
    an output outputting the linear echo estimate signal, the residual echo estimate signal, and the echo canceller output signal to the second input.

11. The method of claim 9, wherein the speech recognition processor includes a deep neural network that was trained using:
    a plurality of different ones of electronic reference signals,
    a plurality of different ones of linear echo estimate signals,
    a plurality of different ones of residual echo estimate signals, and
    a plurality of different ones of echo canceller output signals.

12. The method of claim 8, wherein recognizing speech at the trained speech recognition processor includes:
    spectral feature transformers transforming the raw microphone signal and different types of echo information signals into spectral features in the form of feature vectors; and
    a concatenator combining the feature vectors into a total vector that represents the raw microphone signal and different types of echo information signals for a period of time.

13. The method of claim 12, wherein the spectral feature transformers and the concatenator are used to recognize user speech while using the system.

14. The method of claim 8, further comprising:
a noise suppressor producing different types of ambient noise suppression signals from the raw microphone signal,
wherein the plurality of types of echo information signals include the different types of ambient noise suppression signals.

15. A method of training a speech recognition system (SRS) comprising:
receiving at a first input, a plurality of raw microphone signals having a user voice signal based on a sample of user speech during a period of time and an echo signal based on a sample of sound produced by a speaker during the period of time;
receiving at a second input, a plurality of types of echo information signals during the period of time, each type of echo information signal including information derived by an echo cancellation system from the echo signal; and
training a speech recognition processor to recognize speech based on the raw microphone signals and the plurality of types of echo information signals.

16. The method of claim 15, further comprising:
the speaker receiving a plurality of electronic reference signals; and
the speaker producing the sound in response to the speaker receiving the electronic reference signals,
wherein the plurality of types of echo information signals include the plurality of electronic reference signals, a plurality of linear echo estimate signals, a plurality of residual echo estimate signals, and a plurality of echo canceller output signals, and
wherein the plurality of types of echo information signals are derived by the echo cancellation system from the echo signal in the plurality of raw microphone signals, and the plurality of reference signals.

17. The method of claim 16, further comprising:
receiving the raw microphone signals at a microphone input of the echo cancelation system;
receiving the electronic reference signals at an electronic reference signal input of the echo cancelation system;
an echo processor of the echo cancellation system using the raw microphone signals and the electronic reference signals to produce the linear echo estimate signals, the residual echo estimate signals, and the echo canceller output signals; and
an output outputting the linear echo estimate signals, the residual echo estimate signals, and the echo canceller output signals to the second input.

18. The method of claim 16, wherein the speech recognition processor includes a deep neural network (DNN), and further comprising training the DNN using:
the plurality of electronic reference signals,
the plurality of linear echo estimate signals,
the plurality of residual echo estimate signals, and
the plurality of echo canceller output signals.

19. The method of claim 15, wherein training the speech recognition processor includes:
spectral feature transformers transforming the raw microphone signals and the plurality of types of echo information signals into spectral features in the form of feature vectors; and
a concatenator combining the feature vectors into a total vector that represents the raw microphone signals and the plurality of types of echo information signals for a period of time.

20. The method of claim 19, wherein the spectral feature transformers and the concatenator are used to train the speech recognition processor based on recorded audio information.

21. The method of claim 15, further comprising:
a noise suppressor producing a plurality of different types of ambient noise suppression signals from the raw microphone signals,
wherein the plurality of types of echo information signals include the plurality of different types of ambient noise suppression signals.

* * * * *